United States Patent [19]

Miyamura et al.

[11] Patent Number: 5,372,843
[45] Date of Patent: Dec. 13, 1994

[54] PROCESS FOR PRODUCING A MAGNETIC RECORDING MEDIUM USING A PATTERNED DIFFUSION BARRIER

[75] Inventors: Yoshinori Miyamura, Nishitama; Masaaki Futamoto, Tsukui; Yoshibumi Matsuda, Hachiouji, all of Japan

[73] Assignee: Hitachi, Ltd., Tokyo, Japan

[21] Appl. No.: 847,276

[22] Filed: Mar. 10, 1992

[30] Foreign Application Priority Data

Mar. 12, 1991 [JP] Japan .................................. 3-046348

[51] Int. Cl.$^5$ ................................................ G11B 5/00
[52] U.S. Cl. ............................ 427/130; 428/694 TS; 428/694 TR; 428/900; 428/928; 427/131
[58] Field of Search ............... 427/127, 128, 129, 130, 427/131, 546, 372.2; 428/64, 65, 336, 448, 611, 641, 666, 667, 686, 694, 900, 928, 163, 164; 360/135

[56] References Cited

U.S. PATENT DOCUMENTS

| | | | |
|---|---|---|---|
| 3,420,756 | 1/1969 | Terajima | 427/641 |
| 3,902,930 | 9/1975 | Sata et al. | 148/31.55 |
| 4,403,138 | 9/1983 | Battanel et al. | 235/493 |
| 4,833,020 | 5/1989 | Shiroishi et al. | 428/336 |

FOREIGN PATENT DOCUMENTS 1443248 7/1976 United Kingdom .

OTHER PUBLICATIONS

A. S. Hoadland "Recording Medium with Discrete Alternate Track of Differing Coercive Force" I.B.M. Tech. Discl. Bull Vol 20 No 7 Dec 1977.
C. H. Bajorek et al "Magnetically Discrete but Physically Continuous Recording Tracks" I.B.M. Tech Disl Bull. vol. 18 No 5 Oct 1975.

*Primary Examiner*—Stevan A. Resan
*Attorney, Agent, or Firm*—Antonelli, Terry, Stout & Kraus

[57] ABSTRACT

A magnetic recording medium comprising a substrate, a diffusion element layer formed on the substrate from a material to be diffused into a magnetic film by heating, a diffusion barrier formed in a desired pattern on the diffusion barrier, and the magnetic film formed on the pattern of the diffusion barrier and on other area than the area of the pattern, the magnetic film having a portion of reduced saturation magnetization in repetition in a direction perpendicular to a recording direction. The magnetic recording medium can be obtained by forming a diffusion element layer, a diffusion barrier in a desired pattern, and a magnetic film, in a stacked form on a substrate, followed by heating.

11 Claims, 1 Drawing Sheet

PROCESS FOR PRODUCING A MAGNETIC RECORDING MEDIUM USING A PATTERNED DIFFUSION BARRIER

BACKGROUND OF THE INVENTION

This invention relates to a magnetic recording medium for use in information recording and to a process for producing the same. More particularly, the invention relates to a magnetic recording medium having high recording density and to a process for producing the same.

Conventional magnetic recording media, for instance magnetic discs, have generally been manufactured by forming a magnetic recording film on an aluminum substrate having a thickness of 2 mm, by spin coating, sputtering or the like. The magnetic recording film is either a film having high perpendicular magnetic anisotropy or a film having high in-plane magnetic anisotropy. Upon recording in use of such magnetic recording discs, either perpendicular magnetic domains or in-plane magnetic domains are produced according as the recording film is of the high perpendicular magnetic anisotropy type or of the high in-plane magnetic anisotropy type.

The conventional recording system as above is not the best one, from the viewpoint of recording density. For obtaining higher recording density, therefore, U.S. Pat. No. 4,633,451 discloses a magnetic disc having a servo track layer which is provided on a magnetic recording layer and in which a servo pattern is recorded to provide a variation in reflectance. This magnetic disc is high in recording track density, because it is unnecessary to spare part of the data-recording area for recording of servo information. In addition, the magnetic disc is suitable for control of magnetic-head positioning.

As for the servo track, U.S. Pat. No. 4,633,451 describes some examples, one of which is a continuous groove undulated laterally across the information-recording track of the magnetic recording medium, as shown in FIG. 6.1 of the U.S. patent, and another one is a continuous hole provided on each side of the recording track, as shown in FIG. 6.2 of the U.S. patent. The magnetic recording medium, in practice, is manufactured by forming a magnetic recording medium uniformly on a substrate which has been provided with a roughened surface by patterning, as described above. According to the manufacturing process, however, the magnetic recording film is obtained as a uniform film, leading to insufficient magnetic separation between adjacent tracks and, hence, unsatisfactory signal separation between adjacent tracks.

SUMMARY OF THE INVENTION

It is accordingly an object of this invention to provide a magnetic recording medium in which information-recording tracks are magnetically separated from each other by a difference in saturation magnetization. It is another object of this invention to provide a process for producing said magnetic recording medium. The magnetic recording film referred to herein may be either an in-plane magnetic domain type recording film or a perpendicular magnetic domain type recording film.

The above objects can be attained by one or a combination of the followings:

(1) A magnetic recording medium comprising a non-magnetic substrate, a diffusion element layer provided on the substrate, the diffusion element layer comprising a material to be diffused into a magnetic recording film, a diffusion barrier provided in a desired pattern on the diffusion element layer, and the magnetic recording film provided on the pattern of the diffusion barrier and on other area than the area of the pattern, wherein the magnetic recording film has a portion reduced in saturation magnetization, the portion located in the other area than the area of the pattern of the diffusion barrier.

(2) The magnetic recording medium as set forth in paragraph (1) above, wherein the diffusion barrier has a pattern repeated in a direction perpendicular to a recording direction.

(3) The magnetic recording medium as set forth in paragraph (1) above, wherein the magnetic recording film has the portion of reduced saturation magnetization repeated in a direction perpendicular to the recording direction.

(4) The magnetic recording medium as set forth in paragraph (1) above, wherein the portion of reduced saturation magnetization of the magnetic recording film forms a separator for separation between adjacent tracks.

(5) The magnetic recording medium as set forth in paragraph (1) above, wherein the diffusion is carried out by heating.

(6) The magnetic recording medium as set forth in paragraph (1) above, wherein the diffusion is carried out by heating at a temperature of 300° to 500° C.

(7) The magnetic recording medium as set forth in paragraph (1) above, wherein the pattern of the diffusion barrier is concentric patterns or a spiral pattern.

(8) The magnetic recording medium as set forth in paragraph (1) above, wherein the diffusion barrier comprises one member selected from the group consisting of Cr, Cr-Ti alloys and Ti-Ta alloys.

(9) The magnetic recording medium as set forth in paragraph (1) above, wherein the diffusion barrier has a thickness of 50 to 200 nm.

(10) The magnetic recording medium as set forth in paragraph (1) above, wherein the diffusion element layer comprises one member selected from the group consisting of elemental Ge, elemental Si, elemental Cr, Ge-Si alloys, Ge-Sn alloys and Mg-Ti alloys.

(11) The magnetic recording medium as set forth in paragraph (1) above, wherein the diffusion element layer has an overall thickness of 20 to 100 nm.

(12) The magnetic recording medium as set forth in paragraph (1) above, wherein the magnetic recording medium is a magnetic disc.

(13) A process for producing a magnetic recording medium comprising:
  a first step for forming, on a non-magnetic substrate, a diffusion element layer comprising a material to be diffused into a magnetic recording film;
  a second step for forming a diffusion barrier on the diffusion element layer;
  a third step for forming the diffusion barrier into a desired pattern;
  a fourth step for forming the magnetic recording film on the pattern of the diffusion barrier and on other area than the area of the pattern; and
  a fifth step for diffusing the material of the diffusion element layer in the other area than the area of the pattern of the diffusion barrier into the magnetic recording film, whereby the magnetic recording film is reduced in saturation magnetization in the portion thereof into which the material is diffused.

(14) The process as set forth in paragraph (13) above, wherein the diffusion barrier has a pattern repeated in a direction perpendicular to a recording direction.

(15) The process as set forth in paragraph (13) above, wherein the magnetic recording film has the portion of reduced saturation magnetization repeated in a direction perpendicular to the recording direction.

(16) The process as set forth in paragraph (13) above, wherein the portion of reduced saturation magnetization of the magnetic recording film forms a separator for separation between adjacent tracks.

(17) The process as set forth in paragraph (13) above, wherein the diffusion is carried out by heating.

(18) The process as set forth in paragraph (13) above, wherein the diffusion is carried out by heating at a temperature of 300° to 500° C.

(19) The magnetic recording medium as set forth in claim 1, wherein the pattern of the diffusion barrier is concentric patterns or a spiral pattern.

(20) The process as set forth in paragraph (13) above, wherein the diffusion barrier comprises one member selected from the group consisting of Cr, Cr-Ti alloys and Ti-Ta alloys.

(21) The process as set forth in paragraph (13) above, wherein the diffusion barrier has a thickness of 50 to 200 nm.

(22) The process as set forth in paragraph (13) above, wherein the diffusion element layer comprises one member selected from the group consisting of elemental Ge, elemental Si, elemental Cr, Ge-Si alloys, Ge-Sn alloys and Mg-Ti alloys.

(23) The process as set forth in paragraph (13) above, wherein the diffusion element layer has an overall thickness of 20 to 100 nm.

(24) The process as set forth in paragraph (13) above, wherein the magnetic recording medium is a magnetic disc.

The magnetic recording film preferably has a thickness in the range from 20 to 100 nm. If the thickness is less than 20 nm, properties for sliding between the recording film and a magnetic head will be poor. If the thickness exceeds 100 nm, on the other hand, frequency characteristics on information reproduction be lowered, making it impossible to achieve high-density recording.

The magnetic recording film may be formed by use of known materials such as rare earth-containing ferrites, garnet, Co-containing alloys, etc.

The diffusion element layer comprises a material to be diffused into the adjacent magnetic recording film, thereby causing a change in the magnetic properties of the recording film. The thickness of the diffusion element layer is preferably from 20 to 100 nm, because a film thickness approximate to that of the magnetic recording film is needed for the diffusion element layer to serve as a source of diffusion elements.

Suitable materials for forming the diffusion element layer include, for example, elements such as Ge, Si, Cr, etc., and alloys such as Ge-Si alloys, Ge-Sn alloys, Mg-Ti alloys, etc.

The diffusion barrier is provided for preventing the diffusion of the material of the diffusion element layer. The thickness of the diffusion barrier is preferably from 50 to 200 nm. If the thickness is less than 50 nm, the desired preventive effect on the diffusion cannot be attained, that is, the material of the diffusion element layer can diffuse through the barrier to reach the magnetic recording film. If the thickness is more than 200 nm, it is difficult to achieve accurate patterning of the diffusion barrier. Materials suitable for forming the diffusion barrier include Cr, Cr alloys, Ti, Ti alloys, etc.

The diffusion, of the material of the diffusion element layer into the magnetic recording film, is carried out preferably at a temperature of 300° to 500° C. for a period of about 5 minutes to about 1 hour. If the temperature is lower than 300° C., the intended diffusion reaction hardly takes place, whereas temperatures above 500° C. cause deterioration of the diffusion element layer.

The portion made non-magnetic or reduced in saturation magnetization, of the magnetic recording film, is preferably present in a repeated pattern at a pitch of from 1.2 to 5 μm. It is preferable that said portion has a saturation magnetization lowered to or below 50% of an original value, and it is more preferable that the portion is non-magnetic.

The reduction of the saturation magnetization to or below 50% of an original value, by diffusion, can be achieved by heating at 500° C. for about 5 minutes. At 300° C., on the other hand, the diffusion process takes about 1 hour and the resulting structure is poor in stability.

According to this invention, a magnetic recording medium of a discrete structure, namely, a structure having recording regions magnetically separated from each other can thus be realized, which ensures easy detection of magnetic information. In addition, it is possible to move a magnetic information recording/reproducing means following accurately the information-recording tracks which are formed in high density.

DESCRIPTION OF THE PREFERRED EMBODIMENTS

Some preferred embodiments of this invention will now be described with reference to the attached drawing. The manufacturing process for a magnetic recording medium according to the invention will be outlined first, and detailed explanations of each process step will be given later.

Figure 1A:
FIGS. 1(a) through 1(i) schematically illustrate the process steps for manufacturing a magnetic recording medium according to one embodiment of this invention.
Figure 1B:
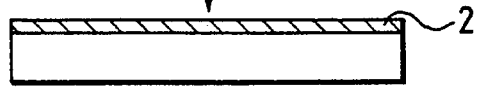
Figure 1C:
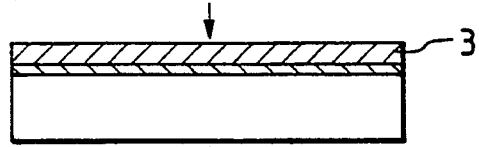

FIGS. 1(a) through 1(i) illustrate one exemplary process for producing a magnetic recording medium according to this invention. On a cleaned, stress-reinforced glass substrate 1 (FIG. 1a), a diffusion element layer 2 is formed by sputtering, vacuum evaporation or other similar method (FIG. 1b). The diffusion element layer has such a function that when heated, a material of the layer is diffused into a magnetic recording film adjacent to the layer, thereby causing a change in the magnetic properties of the recording film. On the diffusion element layer, a diffusion barrier 3 for preventing the diffusion is provided (FIG. 1c).

Figure 1D:
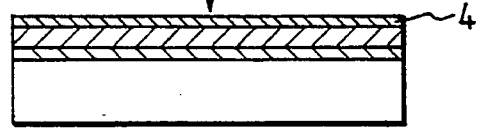
Figure 1E:
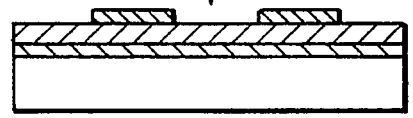
Figure 1F:
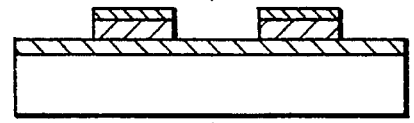
Figure 1G:
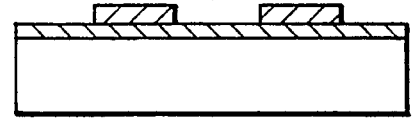

Then, a layer of a photosensitive material, for example, a resist 4 is formed by spin coating (FIG. 1d). The resist layer is subjected to exposure through a separately prepared mask, followed by development to form a resist pattern (FIG. 1e). Thereafter, the diffusion barrier 3 is etched according to the resist pattern (FIG. 1f), and the resist is removed (FIG. 1g).

Figure 1H:
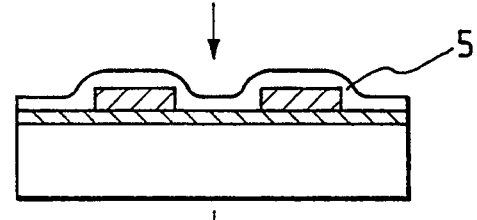
Figure 1I:
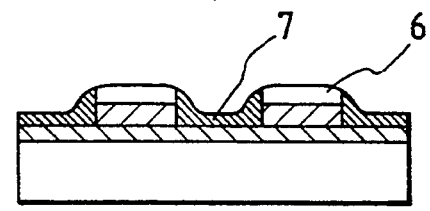

On the entire surface of the structure thus obtained, a magnetic recording film 5 for perpendicular magnetic recording or in-plane magnetic recording is formed (FIG. 1h). Then, annealing is carried out to diffuse the material of the diffusion element layer 2 into selected portions of the magnetic recording film 5, thereby causing a change in magnetic properties of the recording film 5 to occur in those portions. As a result, the magnetic recording film can be made to have a discrete structure which comprises an information-recording track or tracks 6 and a separator or separators 7 therebetween (FIG. 1i).

The change in the magnetic properties of the magnetic recording film may, in the most preferred case, be a change by which the magnetic recording film is rendered non-magnetic. However, a change involving a reduction in saturation magnetization (Ms) to or below 50% of the initial value may suffice.

The diffusion into the magnetic recording film may occur even at normal temperature (room temperature), according to the material for the diffusion element layer and/or the combination of materials for the magnetic recording film. In this invention, therefore, annealing is not always needed. The only requirement as to the diffusion is that a change in the concentration distribution of a constituent should be caused between the magnetic recording film and the diffusion element layer, in areas other than the area where the diffusion is prevented by the diffusion barrier.

EXAMPLE 1

Some embodiments of this invention will now be explained with reference to the case of using a magnetic recording film having a high in-plane magnetic anisotropy.

On a glass sheet with 1.2 mm thickness, sputtering of germanium (Ge) was carried out under the conditions of a background pressure of about $10^{-7}$ Torr and an argon (Ar) pressure of 15 mTorr to deposit Ge in a thickness of 10 nm, thereby forming a diffusion element layer. On the diffusion element layer, a Cr-15at.%Ti alloy was sputtered under the same conditions as above to form a diffusion barrier in a thickness of 100 nm, and a positive-type resist was applied thereto in a thickness of 0.5 µm by spin coating at a revolution rate of 3000 rpm. The resist layer thus formed was then exposed through a mask having concentric track patterns with a separator width of 0.5 µm, an information-recording track width of 2 µm and a track pitch of 2.5 µm. Thereafter the resist was developed and the diffusion barrier was etched with a commercial etching solution containing ceric nitrate as a main constituent, into the same pattern as the mask pattern.

On the diffusion barrier pattern thus formed, a Co-12at.%Cr-8at.%Pt alloy was deposited as an in-plane magnetic recording film in a thickness of 50 nm by sputtering under the same conditions as above. When the specimen thus obtained was annealed by heating at 350° C. for 1 hour, in the areas where the diffusion barrier was absent the material of the diffusion element layer was diffused into the magnetic recording film, whereby the recording film in the areas was changed to be substantially non-magnetic. After a magnetic recording film pattern was thus formed, carbon (C) was deposited thereon as a protective film, to obtain a magnetic recording medium.

When the magnetic recording medium was subjected to measurement of recording and reproduction characteristics by use of a magnetic head, it was found possible to reproduce information at a signal-to-noise ratio (S/N) of 2.2. Also, measurement of recording and reproduction characteristics was carried out by using a magnetic head with a laser chip mounted thereon to project a laser light onto the magnetic recording film, and receiving the reflected light from the diffusion barrier to pick up servo information. It was found possible to reproduce information at an S/N of 2.2.

When a magnetic recording medium was produced in the same manner as above except that a Mg-5at.%Ti alloy was used in place of Ge, the same results as above were obtained. Also, a magnetic recording medium produced in the same manner as above except for using a diffusion barrier composed of a Cr-15at.%Ti alloy instead of Cr gave the same results as above. Further, the same results as above were obtained also when the diffusion barrier thickness was changed from 100 nm to 50 nm and/or the diffusion barrier pattern was changed from the concentric to a spiral pattern. Moreover, a magnetic recording medium produced in the same manner as above except for using a Co-15at.%Cr-5at.%Ta alloy for the magnetic recording film gave the same results as above.

EXAMPLE 2

Some other embodiments of this invention will now be explained with reference to the case of using a magnetic recording film having a high perpendicular magnetic anisotropy.

On a glass plate 1.2 mm in thickness, a Ge-20at.%Si alloy was deposited as a diffusion element layer in a thickness of 30 nm by sputtering under the same conditions as in Example 1. A Ti-15at.%Ta alloy was then deposited thereon as a diffusion barrier in a thickness of 30 nm, and a positive-type resist was applied thereto in a thickness of 0.5 µm by spin coating at a revolution rate of 3000 rpm. The resist layer thus formed was then exposed through a mask having track patterns with a separator width of 0.5 µm, an information-recording track width of 2 µm and a track pitch of 2.5 µm. Thereafter the resist was developed, and the Ti-Ta alloy of the diffusion barrier was etched with a commercial etching solution (hydrofluoric acid), into the same pattern as the mask pattern.

On the diffusion barrier pattern thus obtained, a Co-22at.%Cr alloy was deposited as a perpendicular magnetic recording film in a thickness of 200 nm by sputtering under the same conditions as above. When the specimen thus obtained was annealed by heating at 400° C. for 15 minutes, the material of the diffusion element layer was diffused into the magnetic recording film in predetermined areas, whereby the recording film in the areas was changed to be substantially non-magnetic. After a magnetic recording film pattern was thus formed, carbon (C) was deposited thereon as a protective film in a thickness of 20 nm, to produce a magnetic recording medium.

When measured for recording and reproduction characteristics by use of a magnetic head, the magnetic recording medium was found to be capable of reproducing information at an S/N of 2.2. When tested for recording and reproduction characteristics by an optical servo system using a magnetic head with a laser chip mounted thereon, in the same manner as in Example 1, the magnetic recording medium was found capable of information reproduction at an S/N of 2.2.

As has been stated above, according to this invention, a magnetic recording film of a magnetic recording medium is formed in a discrete form and, therefore, satisfactory magnetic separation between adjacent information-recording tracks can be achieved.

What is claimed is:

1. A process for producing a magnetic recording medium comprising:
   a first step for forming, on a non-magnetic substrate, a diffusion element layer comprising a material to be diffused into a magnetic recording film;
   a second step for forming a diffusion barrier on said diffusion element layer;
   a third step for forming said diffusion barrier into a desired pattern;
   a fourth step for forming said magnetic recording film on said pattern of said diffusion barrier and on the area other than the area of said pattern; and
   a fifth step for diffusing said material of said diffusion element layer in said area other than the area of said pattern of said diffusion barrier into said magnetic recording film, whereby said magnetic recording film is reduced in saturation magnetization in the portion thereof into which said material is diffused, so that said magnetic recording film on said pattern of said diffusion barrier provides information recording track.

2. The process as set forth in claim 1, wherein said diffusion barrier has a pattern repeated in a direction perpendicular to a recording track in a same plane as said magnetic recording medium.

3. The process as set forth in claim 1, wherein said magnetic recording film has said portion of reduced saturation magnetization repeated in a direction perpendicular to said recording track in a same plane as said magnetic recording medium.

4. The process as set forth in claim 1, wherein said portion of reduced saturation magnetization of said magnetic recording film forms a separator for separating information recording tracks.

5. The process as set forth in claim 1, wherein said diffusion is carried out by heating.

6. The process as set forth in claim 1, wherein said diffusion is carried out by heating at a temperature of 300° to 500° C.

7. The process as set forth in claim 1, wherein said diffusion barrier comprises one member selected from the group consisting of Cr, Cr-Ti alloys and Ti-Ta alloys.

8. The process as set forth in claim 1, wherein said diffusion barrier has a thickness of 50 to 200 nm.

9. The process as set forth in claim 1, wherein said diffusion element layer comprises one member selected from the group consisting of elemental Ge, elemental Si, Ge-Si alloys, Ge-Sn alloys and Mg-Ti alloys.

10. The process as set forth in claim 1, wherein said diffusion element layer has an overall thickness of 20 to 100 nm.

11. The process as set forth in claim 1, wherein said magnetic recording medium is a magnetic disc.

* * * * *